Patented Apr. 15, 1930

1,754,473

UNITED STATES PATENT OFFICE

ROBERT B. MacMULLIN AND JESSE A. GUYER, OF LA SALLE, NEW YORK, ASSIGNORS TO THE MATHIESON ALKALI WORKS, INC., OF NEW YORK, N. Y., A CORPORATION OF VIRGINIA

MANUFACTURE OF CALCIUM HYPOCHLORITE

No Drawing. Application filed August 4, 1926. Serial No. 127,168.

This invention relates to improvements in the production of calcium hypochlorite.

This invention provides an improved method of producing calcium hypochlorite which makes it possible to secure a product of high purity and which has several further important advantages in a mechanical as well as a chemical aspect.

In carrying out the present invention, calcium hypochlorite formed by the chlorination of a slurry of lime is salted out, for example, by the addition of sodium chloride. By subsequently adding sodium chloride to promote the separation of calcium hypochlorite, a relatively thin slurry can be used in the chlorination operation, thus making it comparatively easy to effect substantially complete chlorination and also making it easier to maintain agitation during chlorination, while at the same time a satisfactory recovery of calcium hypochlorite can be obtained following the addition of salt, the calcium hypochlorite can be separated in a number of ways, for example by filtration, or by filtration followed by mechanical pressing, or by combined filtration and pressing. The solution remaining after separation of the calcium hypochlorite may advantageously be treated with lime to precipitate basic calcium hypochlorite, which latter may be used in making up lime slurry to be supplied to the chlorination operation. The addition of salt, following chlorination, tends to thicken or stiffen the chlorinated mixture and a part of the solution remaining after the separation of calcium hypochlorite may with advantage be returned and added to the chlorinated mixture to which the salt is added as a diluent without dissolving any of the precipitated calcium hypochlorite. The separated calcium hypochlorite is substantially free from calcium chloride, except as that salt is present in mother liquor remaining in the precipitated material. Any calcium chloride so present can be removed by treating the precipitated material with strong solutions of sodium hydroxide, or better sodium hypochlorite.

The invention will be further illustrated by the following example: 10.5 lbs. of high grade lime (95% $Ca(OH)_2$) are mixed with 28 lbs. of water and chlorinated until the slurry contains not more than about 1% of calcium hydroxide. About 9.4 lbs. of chlorine are required. 2.1 lbs. of finely ground sodium chloride are then added. Agitation is maintained during chlorination, and for about ½ hr. after the addition of salt. The precipitated calcium hypochlorite can then be separated in any convenient or desired manner. It may, for example, be filtered from the solution and then pressed. With a pressure of from 500 to 1,000 lbs. per square inch, the content of mother liquor can be reduced to about 20% of the weight of the cake. The separated filtrate is treated with 7.7 lbs. of lime or less, which combines with calcium hypochlorite present to form a basic calcium hypochlorite which is precipitated. The precipitate is, with advantage, used in making up further quantities of a lime slurry to be subjected to chlorination; the amount of lime to be added for repetition of the operation being less than that originally required in this event by the amount of lime present in this precipitate as a basic hypochlorite. The amount of water to be added is also less than that originally required due to the water present in the precipitated basic hypochlorite, which may be returned to the chlorination operation while wet, and should be sufficient to maintain the ratio of calcium to water at the end of the chlorination operation the same as in the first chlorination operation. In the subsequent chlorination of a slurry so prepared, less chlorine, for example about 7.0 lbs., is usually required. Most of the calcium chloride formed during chlorination is contained in the solution separated from the basic calcium hypochlorite, which may be discarded. This solution may also contain some unrecoverable calcium hypochlorite, for example, an amount up to about 5% of the total present in the system. The major part of the chlorination may be carried out, with advantage, at from 30 to 40° C., to minimize formation of basic hypochlorite compounds, but as the lime present becomes nearly used up the temperature may with advantage be reduced to about 20 to 25° C., to avoid any tendency to over-chlorination or decomposition.

The chlorination operation is advantageously carried approximately to completion, for example, to a point where about 1% of free calcium hydroxide, or less, remains in the slurry. The slurry employed may be sufficiently concentrated so that an appreciable yield of solid calcium hypochlorite is obtained by the time chlorination is completed. This yield, advantageously, is maintained as high as possible without interfering with agitation. An ordinary propeller type of stirrer, for example, may be used during chlorination in carrying out this invention. When salt is added, however, the slurry becomes more difficult to agitate unless a diluent such as a part of the mother liquor from which calcium hypochlorite has been separated is used. This particular diluent is of special value because it makes it possible to thin down the slurry without dissolving precipitated calcium hypochlorite or otherwise interfering with the operation. The diluent may be saturated with sodium chloride before it is added, and salt for salting out the hypochlorite product may with advantage be supplied in the diluent. When a diluent is not employed, it may be desirable to employ some more powerful means for maintaining agitation, for example a plunger type of agitator may be so used. When salt is added to the chlorinated mixture, further quantities of calcium hypochlorite, that is $Ca(OCl)_2$, are precipitated. The recovery is apparently highest when the amount of salt employed is somewhat short of that necessary to effect complete saturation of the liquor with sodium chloride.

As another example of the invention, 10.5 lbs. of 95% $Ca(OH)_2$, are mixed with 37.4 lbs. of water and the mixture chlorinated with about 9.4 lbs of chlorine, and 6 lbs. of sodium chloride are then introduced. As a further example of the invention, 10.5 lbs. of $Ca(OH)_2$ are mixed with 23.9 lbs. of water and chlorinated with about 9.4 lbs. of chlorine, and 1.5 lbs. of salt then introduced. It is particularly advantageous, in carrying out the present invention, to employ lime slurries within the range of concentrations of the two examples just given. The use of a diluent in connection with the addition of salt is particularly useful with slurries which before chlorination approach the concentration of the last example just given.

The calcium hypochlorite product, after separation from the mother liquor, can be dried in any suitable manner, for example in an atmospheric drier or in a vacuum drier, to a water content of 1% or less. The product can be substantially freed, advantageously before drying, from any contaminating calcium chloride by treating it with sufficient sodium hydroxide or sodium hypochlorite to convert any calcium chloride present to calcium hydroxide or calcium hypochlorite, respectively.

It will be apparent that the invention has several important advantages. The invention makes it practicable to employ a relatively thin lime slurry. Complete chlorination is thus more easily effected, and undesirable decomposition more easily avoided. The separation of the calcium hypochlorite product is also facilitated. At the same time, the slurry, particularly during the chlorination operation, is less difficult to handle. By salting out of the calcium hypochlorite formed, a satisfactory recovery of the calcium hypochlorite can nevertheless be obtained. By using a thinner slurry instead of a thicker slurry, an equivalent yield or a yield increased as much as 10% or more may be obtained, in accordance with this invention, by the addition of salt which is an operation much less difficult than the further chlorination of thick slurries. It will also be apparent that the invention provides an improved method of recovering available chlorine from the mother liquor remaining after separation of the calcium hypochlorite product by precipitation with lime in the form of a basic hypochlorite available for use in the making of further quantities of slurry to be subjected to chlorination. Any excess of lime added to the mother liquor for precipitation of basic calcium hypochlorite is thus also returned to the chlorination operation with the precipitated basic hypochlorite.

When sodium chloride is present in the beginning of the chlorination some of the calcium hypochlorite may be precipitated from solution during the chlorination, and, if sufficient sodium chloride is present at the outset, or is added during the chlorination, the calcium hypochlorite will be for the most part thrown out of solution during the chlorination. We regard it as more advantageous however to carry out the chlorination first and add the sodium chloride afterward, since by doing so a relatively thin slurry can be used in the chlorination operation and the calcium hypochlorite salted out therefrom after the chlorination is completed.

We claim:

1. A process of making calcium hypochlorite which comprises chlorinating a lime slurry and salting out calcium hypochlorite from the chlorinated mixture.

2. A process of making calcium hypochlorite which comprises chlorinating a lime slurry and promoting the separation of calcium hypochlorite from the chlorinated mixture by the addition of sodium chloride.

3. A process of making calcium hypochlorite which comprises chlorinating a lime slurry and salting out calcium hypochlorite from the chlorinated mixture, the salting out operation being carried out with the simultaneous addition of a diluent solution substantially saturated with calcium hypochlorite.

4. A process of making calcium hypochlorite which comprises chlorinating a lime slurry and promoting the separation of calcium hypocholrite by the addition of sodium chloride, and employing the solution remaining after separation of the calcium hypochlorite as a diluent in connection with the addition of sodium chloride to promote the separation of calcium hypochlorite in the process.

5. A process of making calcium hypochlorite which comprises chlorinating a lime slurry and separating calcium hypochlorite from the chlorinating mixture, adding lime to the solution remaining after separation of calcium hypochlorite and thereby precipitating basic calcium hypochlorite together with any excess lime, and supplying the precipitated material to a subsequent chlorination operation.

6. A process of making calcium hypochlorite which comprises precipitating a basic calcium hypochlorite from a calcium hypochlorite solution by the addition of lime, separating the precipitate, and subjecting the separated precipitate to chlorination.

7. A process of making calcium hypochlorite which comprises chlorinating a lime slurry containing not more than about 37 lbs. of water and not less than about 24 lbs. of water per 10 lbs. of lime and salting out calcium hypochlorite from the chlorinated mixture.

8. A process of making calcium hypochlorite which comprises chlorinating a lime slurry containing not more than about 37 lbs. of water and not less than about 24 lbs. of water per 10 lbs. of lime and promoting the separation of calcium hypochlorite from the chlorinated mixture by the addition of sodium chloride.

9. A process of making calcium hypochlorite which comprises chlorinating a lime slurry, and promoting the separation of calcium hypochlorite by the addition of sodium chloride, at least a part of the sodium chloride being supplied dissolved in a diluent.

In testimony whereof we affix our signatures.

ROBERT B. MacMULLIN.
JESSE A. GUYER.